April 20, 1954 K. R. HESSE 2,676,110
METHOD OF PRODUCING LUMINESCENT SCREENS
Filed July 26, 1950
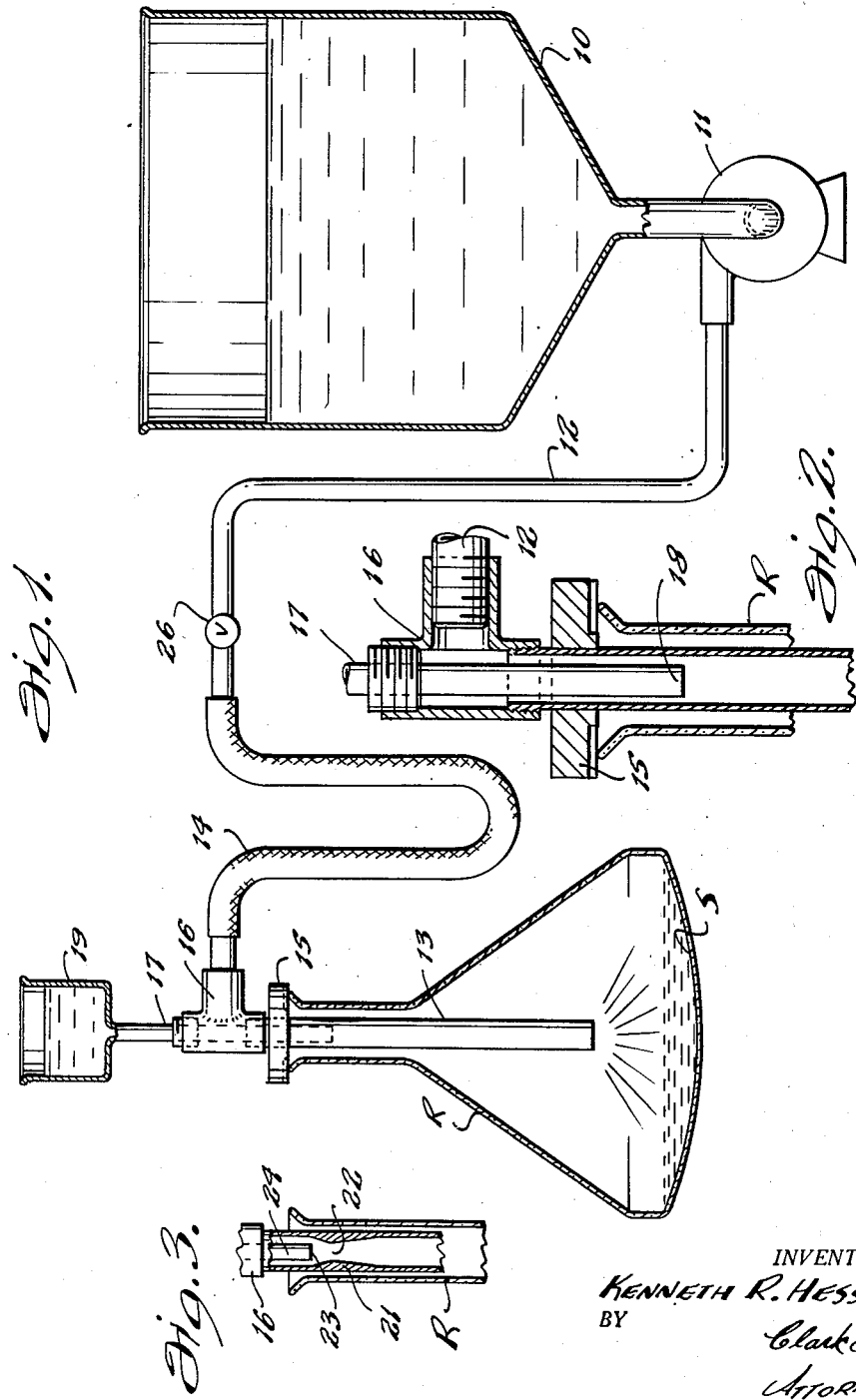
INVENTOR.
KENNETH R. HESSE
BY
Clark & Utt
ATTORNEYS Patented Apr. 20, 1954

2,676,110

UNITED STATES PATENT OFFICE 2,676,110

METHOD OF PRODUCING LUMINESCENT SCREENS

Kenneth R. Hesse, Packanack Lake, N. J., assignor to Tel-O-Tube Corporation of America, East Paterson, N. J., a corporation of New Jersey Application July 26, 1950, Serial No. 175,906

1 Claim. (Cl. 117—33.5)

This invention relates to luminescent screens on the inner surface of glass bulbs such as a bulb adapted to be employed in cathode ray tubes and the invention has particular reference to an improved method for producing the screen.

The invention has for an object to provide a method of applying luminescent material to the inner surface of bulbs so as to produce a uniform distribution of the luminescent material on the inner surface thereof.

Another object of the invention is to provide a method by which a luminescent material in suspension is introduced into a stream of an electrolyte flowing under pressure which luminescent material is mixed therewith and flows with the electrolyte into the bulb and the combined solutions partially filling the bulb to permit of the settling of the luminescent material on the inner surface of the bulb.

Heretofore luminescent screens have been produced on the inner surface of glass bulbs by dusting powdered phosphor material onto a binder coated over the inner surface of the bulbs, or by spraying phosphor material and a binder directly on the inner surface thereof, or by a settling method which consists of introducing a quantity of a settling solution such as dilute potassium silicate into an inverted glass bulb and introducing phosphor material into the settling solution by spraying the same through a thistle tube having a nozzle on the end thereof. The quality of the luminescent screens produced by these methods depends to a large extent upon the skill and ability of the operator. The luminescent screens produced thereby may be of non-uniform distribution if the spray tip is not held the proper distance from the inner surface of the tube. The luminescent screen may also exhibit a distorted area along the edge thereof due to improper spraying.

The present invention provides a method which eliminates spraying of the luminescent material as well as eliminating to a large extent the personal element involved in the aforesaid methods, and which produces a substantially uniform screen and provides increased production.

With the foregoing and other objects in view, reference is now made to the following specification and accompanying drawings in which is illustrated one form of apparatus for carrying out the method.

In the drawings:

Fig. 1 is a view in elevation of an apparatus for carrying out the invention.

Fig. 2 is an enlarged fragmentary sectional view thereof.

Fig. 3 is a similar view showing a modified form of discharge tube.

The apparatus for carrying out the invention includes a receptacle 10 for containing a quantity of an electrolyte sufficient for processing a number of glass bulbs R for producing cathode ray tubes. The receptacle 10 is connected with the intake of a pump 11 such as a rotary pump which is connected by means of a conduit 12 to a discharge tube 13. The conduit 12 includes a flexible section 14 to facilitate the handling of the discharge tube for inserting it in a glass bulb R and for removing the same therefrom. A collar 15 tightly engages the discharge tube 13 so that the lower end thereof may be adjusted the proper distance from the inner surface S of the bulb R by supporting the collar on the open upper end thereof and adjusting the collar longitudinally to the desired location on the discharge tube 13.

The discharge tube 13 is connected with the conduit 12 by means of a T 16 and extending downwardly therethrough is an outlet pipe 17 having its open lower end 18 located in the discharge tube 13 and with the upper end of said outlet tube connected with a receptacle 19 adapted for receiving luminescent material in suspension sufficient in quantity for processing a bulb R.

When the discharge tube 13 has been positioned in a bulb R for supplying luminescent material to the inner surface thereof, the electrolyte is forced under pressure by the pump 11 through the conduit 12 which causes the electrolyte to pass downwardly through the discharge tube 13 to thereby produce a suction at the discharge outlet 18 of the outlet pipe 17 and draw a quantity of the luminescent material in suspension from the receptacle 19. The electrolyte and luminescent material co-mingle in the lower end of the discharge tube 13 and the pressure at which the same are discharged into the bulb R insures complete agitation of the solutions therein causing the luminescent material to be distributed uniformly throughout the electrolyte. Sufficient quantities of the solutions are admitted to the bulb R to cover the portion of the inside surface thereof which is to be coated with the luminescent material and to insure satisfactory distribution. After the electrolyte and the luminescent material have been admitted to the bulb, the discharge tube 13 is removed and the bulb allowed to stand undisturbed for a period of time to permit the materials to be deposited out of suspension after which the supernatant liquid is decantered or siphoned off leaving an adhesive coating on the inside surface of the bulb in which the luminescent material is embedded. The bulb is then heated in an oven to bake the coating on the inner surface thereof.

In order to increase the suction, the discharge tube 21 shown in the modified form in Fig. 3, is restricted as at 22 below the open lower end 23 of an outlet pipe 24 so as to provide a venturi or throat at the restriction 22. The discharge tube 21 is connected with the T 16 as described and the outlet pipe 24 extends through the T 16 and is connected with a receptacle such as the receptacle 19.

The electrolyte may consist of a settling solution such as potassium silicate, potassium silicate and sodium sulfate, potassium silicate and potassium sulfate, potassium silicate and barium hydroxide, potassium silicate and barium acetate, potassium silicate and calcium acetate or any other equivalent electrolyte or mixture thereof suitable for depositing a luminescent material out of suspension therewith. The luminescent material may be zinc sulfides, zinc cadmium sulfides, their corresponding selenides or sulfoselenides, zinc orthosilicate, calcium tungstate, zinc oxide or any other inorganic phosphor capable of settling through an electrolyte. The luminescent material is thoroughly mixed in a solution of potassium or other alkali metal silicates so that the luminescent material is in suspension therein. When the electrolyte and luminescent material in suspension are admitted to the glass bulb, the luminescent material will deposit upon the inner surface of the bulb and adhere thereto by the adhesive coating clinging to the surface of the bulb and to each particle of luminescent material. The coating may be potassium or other alkali metal silicates or colloidal silicic acid formed by chemical reaction of the ingredients in the electrolyte and potassium silicate or other alkali metal silicates in which the luminescent material is in suspension.

The apparatus is preferably provided with a valve 26 interposed in the conduit 12 for regulating and closing off the flow of electrolyte from the receptacle 10.

In operation, the discharge tube 13 is inserted in a glass bulb R with the collar 15 resting upon the open end thereof and the outlet end of the discharge tube disposed in spaced relation from the inner surface S of the bulb. The valve 26 is then opened to permit the flow of electrolyte into the bulb. When the flow has started, a measured quantity of the luminescent material in suspension sufficient for a single glass bulb is poured into the receptacle 19. The luminescent material in suspension is drawn into the discharge tube 13 by suction produced by the flow of electrolyte in said tube. The quantity of electrolyte and luminescent material in suspension supplied to the bulb is sufficient to cover the portion of the inner surface thereof which is to be coated with the luminescent material. The discharge tube is then removed after which the luminescent material is permitted to settle upon the inner surface of the glass bulb which adheres thereto by the adhesive coating clinging to the inner surface of the bulb and to each particle of luminescent material. The supernatant liquid is then removed from the bulb.

It should be understood that the method is not limited in scope by the specific materials set forth herein but that it is applicable to any mixture of electrolyte or binder materials that will permit the formation of a luminescent screen by settling out of suspension. It is also to be understood that the apparatus employed to carry out the method is not limited to the specific apparatus shown and described but that the invention shall cover the use of all changes and modifications of the example of the apparatus herein chosen for purposes of the disclosure which do not depart from the spirit or scope of the invention.

What is claimed is:

The method of applying a luminescent screen to a portion of the inner surface of a hollow transparent article having an open end, including positioning such hollow article to serve as a liquid receptacle with the open end thereof projecting upwardly, inserting a discharge device into the hollow article through such open end, discharging a measured portion of a settling solution of an electrolyte including potassium silicate in a stream into the hollow article under pressure, introducing into the stream of electrolyte within said hollow article a measured portion of luminescent material in suspension in a solution of an alkali metal silicate and which is capable of suspension in said electrolyte and of subsequent settling out of such suspension, said electrolyte and luminescent material being co-mingled within the hollow article at the lower end of the discharge device in a liquid mixture with said luminescent material in suspension therein and forming an adhesive coating on the luminescent material, causing said co-mingled electrolyte-and-luminescent-material liquid mixture to fill the hollow article to a depth to cover the portion of the inner surface of the hollow article which is to be coated with the luminescent screen, retaining the hollow article in such position until the required quantity of the suspended luminescent material has settled out from the mixture upon that portion of the inner surface of the hollow article which is to be coated and to adhere thereto by the adhesive coating, and then removing the supernatant residual from the hollow article.

References Cited in the file of this patent

UNITED STATES PATENTS

| Number | Name | Date |
|---|---|---|
| 2,451,590 | Tidik et al. | Oct. 19, 1948 |
| 2,536,586 | Waye et al. | Jan. 2, 1951 |